Dec. 21, 1948.  H. J. CRINER  2,456,866
BREAD SLICING MACHINE, INCLUDING
GANGS OF ROTARY DISK KNIVES
Filed Sept. 11, 1944  3 Sheets-Sheet 1
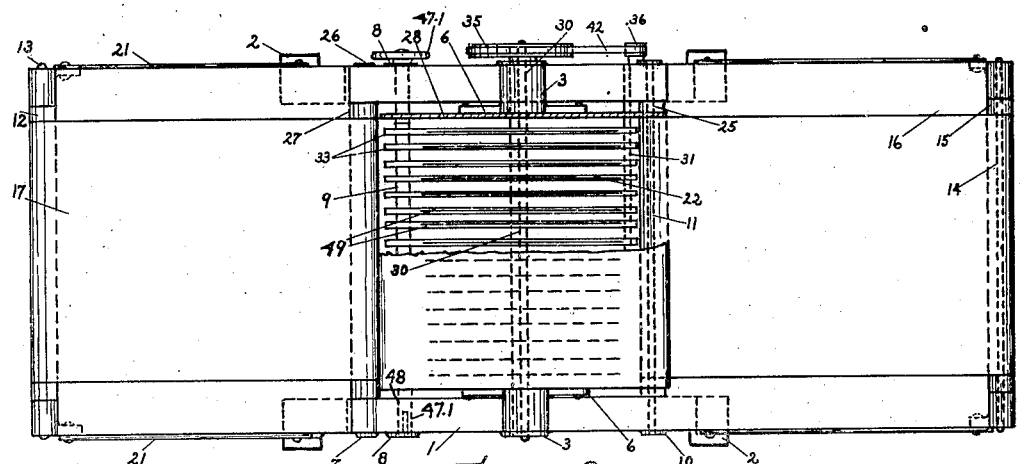
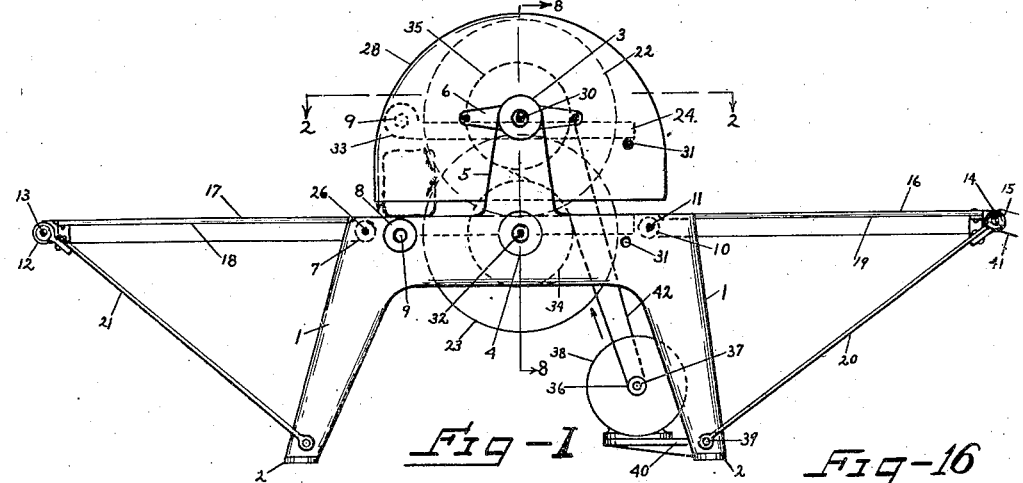
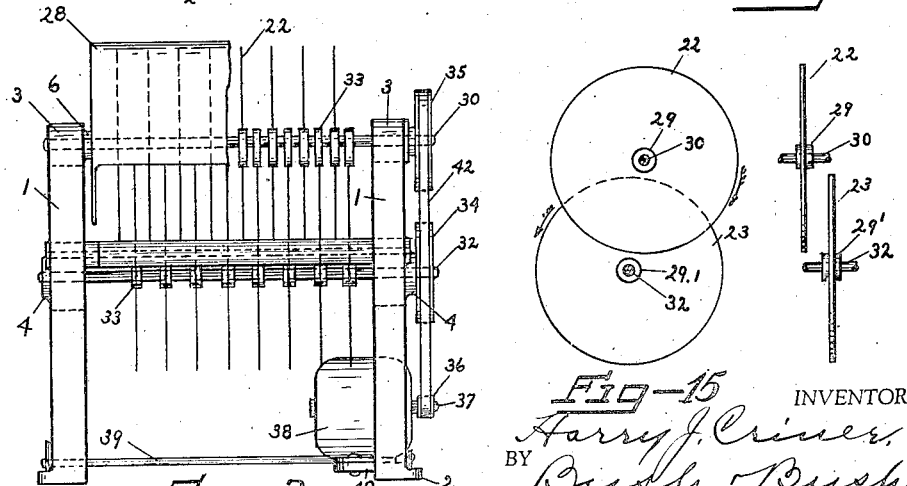
INVENTOR.
Harry J. Criner,
BY Bush & Bush,
His Attorneys.

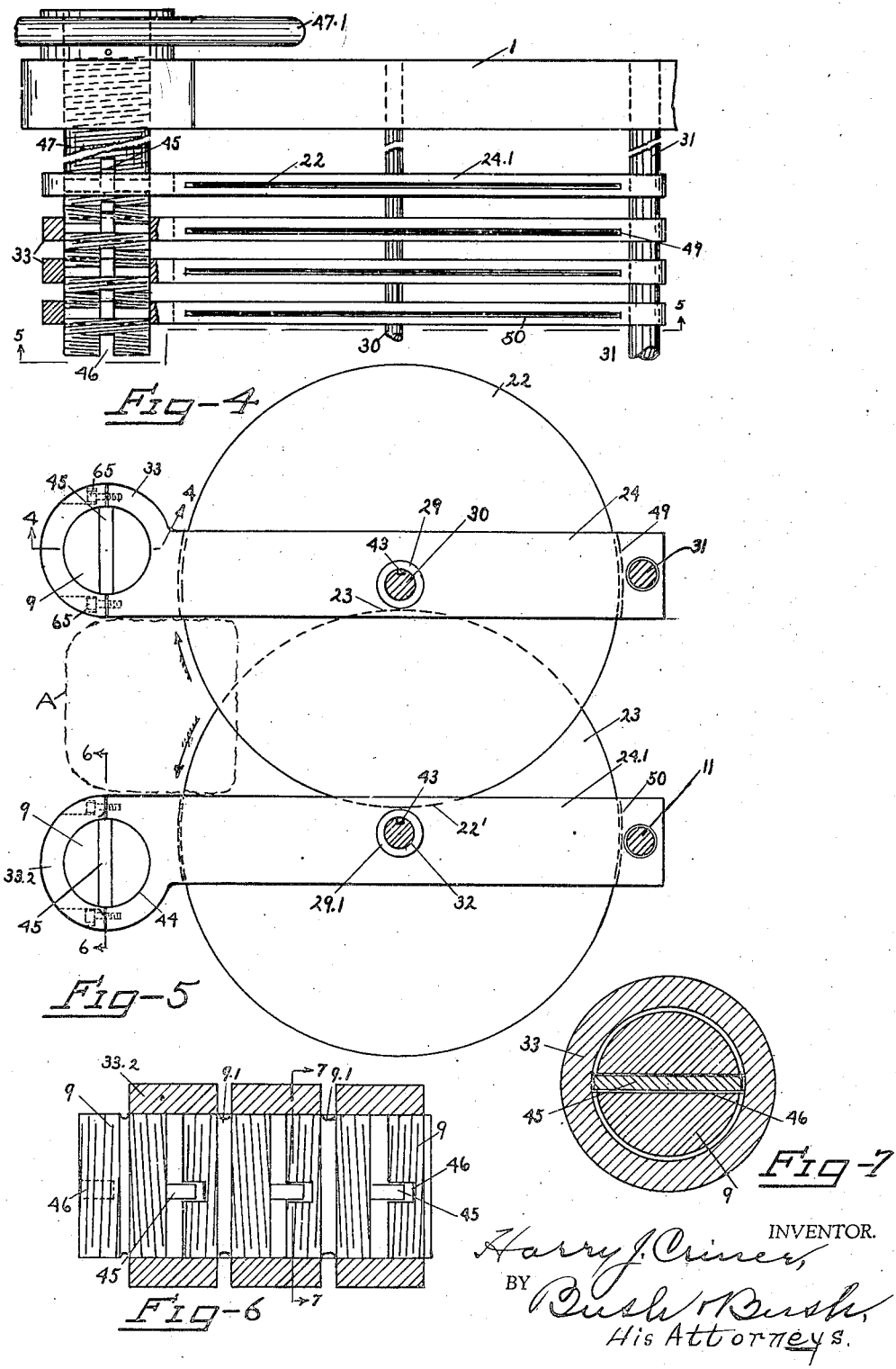

Dec. 21, 1948.     H. J. CRINER     2,456,866
BREAD SLICING MACHINE, INCLUDING
GANGS OF ROTARY DISK KNIVES
Filed Sept. 11, 1944     3 Sheets-Sheet 3
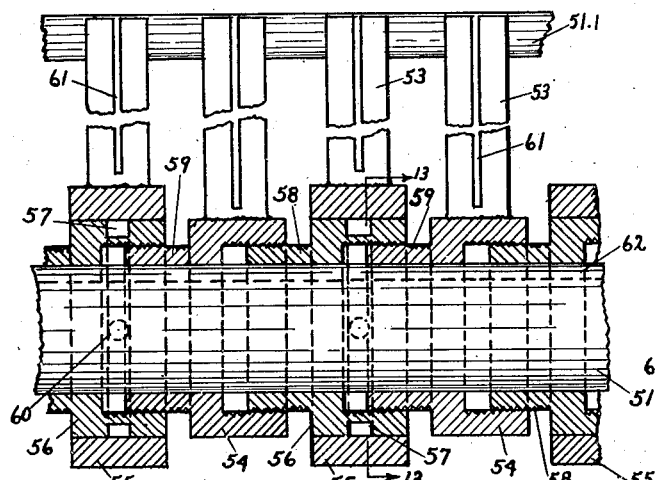
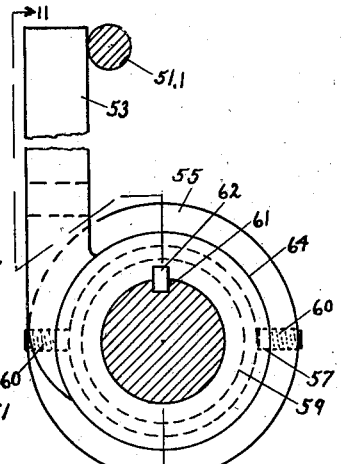
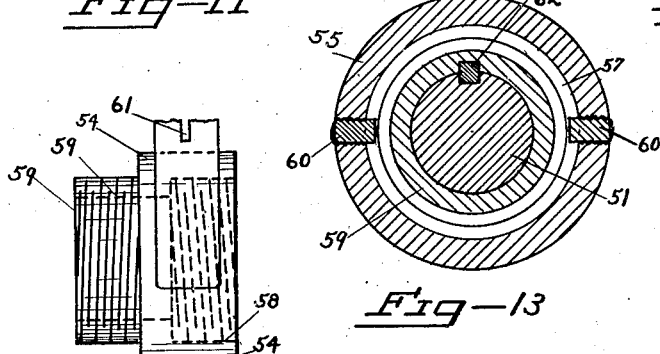
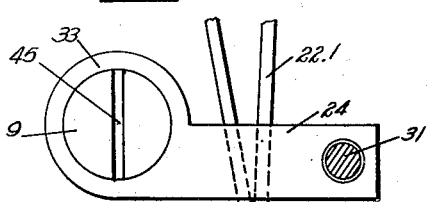
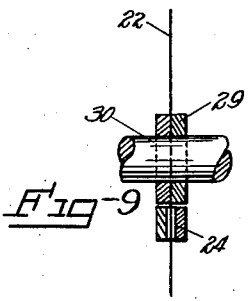
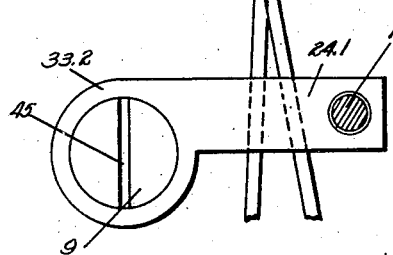
Harry J. Criner, INVENTOR.
BY Bush & Bush
His Attorneys.

Patented Dec. 21, 1948

2,456,866

UNITED STATES PATENT OFFICE 2,456,866

BREAD SLICING MACHINE, INCLUDING GANGS OF ROTARY DISK KNIVES

Harry J. Criner, Davenport, Iowa, assignor of one-half to A. G. Bush, Davenport, Iowa Application September 11, 1944, Serial No. 553,619

10 Claims. (Cl. 146—98)

My invention relates to improvements in bread slicing machines, and spacing adjusters.

The objects of my invention are to provide an improved form of rotary blade bread slicing machines in which the blades are arranged in alternation in upper and lower series spaced apart and revolved in opposite directions; to provide means which will permit the use of rotary blades without tearing or crushing the bread during the slicing operation; to provide improved means for changing or adjusting the spacing of a plurality of cutting blades of a bread slicing machine; to provide means in a circular blade slicing machine by which the two pan corners of a loaf of bread may be presented so as to contact the cutting blades simultaneously or in close succession.

Other objects will appear from the description.

I accomplish these objects by the means illustrated in the accompanying drawings, in which, Figure 1 is a side elevation of my apparatus;

Figure 2 is a top or plan view with a part of the blade cover broken away and showing one end plate of the cover in section on the line 2—2 of Figure 1;

Figure 3 is a rear end view but with part of the cover broken away and omitting the conveyor;

Figure 4 is an enlarged detail showing part of the spacing mechanism in section on the line 4—4 of Figure 5;

Figure 5 is an enlarged detail partly in section showing the relative location of the two series of rotary blades and the spacing and bread supporting means on the line 5—5 of Figure 4;

Figure 6 is an enlarged detail showing the heads in section and the interlocking spacing members in full lines;

Figure 7 is a cross-section on the line 7—7 of Figure 6;

Figure 8 is a vertical sectional detail on the line 8—8 of Figure 1;

Figure 9 is a detail showing a portion of the blade-shaft in full lines and the rings or washers attaching the blades to the shaft, and a spacing bar in section;

Figure 10 is a detail showing a side elevation of the spacing mechanism applied to band blades;

Figure 11 is a vertical section detail showing an alternative form of spacer in which a center shaft is used to actuate the threaded members in place of the tongue shown in Figures 6 and 7, on the line 11—11 of Figure 12, but with the middle portion of the spacing arms broken away and the blades and blade-shaft omitted;

Figure 12 is a side elevation of the mechanism shown in Figure 11, but showing the spacer shaft and supporting bar in section;

Figure 13 is a cross-sectional detail on the line 13—13 of Figure 11;

Figure 14 is a side view of a single one of the unpinned spacing members;

Figures 15 and 16 are side and end views respectively of the knives, one set slightly forwardly of the other set.

My apparatus comprises a frame 1 preferably rectangular in form, with feet 2 cast integral therewith. The frame includes side members suitably connected by cross-members or by shafts or bars. Each side member includes a supporting upright 5 carrying a boss 3 which forms a journal for the upper blade-shaft 30 which extends transversely of the machines. A lower blade-shaft 32 is mounted in bosses or journals 4 formed in the side members. Suitable bearings of the plain or ball-bearing or roller type may be provided for the shafts 30 and 32.

Upon the shaft 30 I mount a plurality of bushings 29 which are freely severally slidable lengthwise of the shaft 30 but secured against rotation by the keys or splines 43, and to or upon the bushings, the cutting blades 22 are rigidly secured. The cutting blades are circular with a radius somewhat longer than the height or width of a loaf of bread to be sliced, and are preferably from ten to fifteen one-thousandths of an inch in thickness while the slots in the spacing bars are slightly wider.

Upon the lower blade-shaft 32 I mount a corresponding series of bushings 29.1 slidable lengthwise of the shaft and keyed or splined to the shaft by keys 43. To these bushings the lower slicing blades 23 are united by spot-welding or other suitable means, and so arranged as to turn with the shaft 32.

Between each pair of the adjacent lower blades I mount upon bushings 29.1 arms or spacing bars 24.1 the rear ends of which are mounted upon and freely slidable of the crossbar 11 secured in the frame at the rear of the blades 23.

The front ends of the bars 24.1 are formed with enlarged heads 33.2 having internal bores 44 formed therein which are internally threaded with threads on the opposite ends running in opposite directions.

Within the heads 33.2 I mount a series of threaded interlocking members 9 having threads formed upon the opposite ends of the periphery thereof running in opposite directions and with an unthreaded portion or groove 9.1 formed between the threaded portions of each section. The external threads upon the interlocking members are arranged to mesh with the internal threads formed in the heads of the spacer bars and each interlocking member is threaded into the two heads on the opposite sides thereof.

Each interlocking member carries upon one end a tongue 45 arranged to interlock with the corresponding groove 46 formed in the adjacent end of the next succeeding interlocking member and so arranged that when one of the interlocking members is turned, the entire series of interlocking members will be turned. If turned in one direction, the threads upon the interlocking members coacting with the threads within the heads 33.2 will cause the spacing arms to spread apart, but if turned in the other direction, will gather the spacing arms together. As the threads are all of the same pitch, the spacing of the adjacent spacing bars will be uniform throughout the entire series.

The upper portions of the heads 33.2 and bars 24.1 extend somewhat above the shaft 32 and form a support for the bread while passing through the cutting blades.

A similar series of spacing arms 24 is similarly mounted upon bushings 29 upon the upper shaft 30 with the rear end supported by the bar 31 and with similar heads formed at the front end thereof, but extending upwardly instead of downwardly as in the lower series. Similar interlocking members 9 with similar tongues 45 and grooves 46 are provided for the upper series of spacing bars.

Each series of interlocking members 9 is partly supported respectively by terminal bars 47 and 48 suitably mounted in the side frame in bosses 8. The bar 47 is slidable lengthwise in the frame so as to permit it to move a distance equal to the sum of the movement of all of the individual adjusting members and is united to its adjacent interlocking member by threads corresponding to the threads of the interlocking members and also connected thereto by a corresponding tongue and groove. The bar 48 may be rigidly mounted in the frame and the interlocking member adjacent to it will be rigidly united thereto by a pin, key or other suitable means so that when the bar 47 is turned in one direction, all of the interlocking members will be expanded or moved away from the fixed member and when the bar 47 is turned in the other direction, the interlocking members will be contracted and moved nearer to the fixed member.

If desired, both of the bars 47 and 48 may be slidably mounted or threaded in the frame and the middle interlocking member of the series may be rigidly fixed in its position so that the interlocking members will expand or contract simultaneously in opposite directions from or toward the fixed central member.

A handwheel 47.1 may be united to the outer end of the bar 47 by which the bar 47 may be turned and if desired, coarse threads may be formed upon the bar 47 whereby when the handwheel 47.1 is turned, the bar 47 will be carried outwardly or inwardly a distance equal to the sum of the travel of all the interlocking members, but are not essential as the movement of the interlocking adjusters will cause the bar 47 to slide in the frame if not threaded.

As the interlocking members move longitudinally, they carry the slotted spacing bars or arms with them and the spacing bars in turn force the cutting blades to move along the blade-shaft correspondingly. Thus the spacing of the blades and the thickness of the slices may be uniformly and simultaneously changed and this may be done either while the blades are in motion idling or when standing still.

The spacing arms are supported in part by the blade-shafts 30—32, in part by the bars 31 and 11, and in part by the two series of interlocking members 9.

The shafts 30 and 32 each has one end projecting beyond the frame on which are mounted pulleys 35 and 34 which may be driven by a belt 42 which in turn is driven by the drive pulley 36 on the motor shaft 37 of the electric motor 38 or other suitable means. The motor 38 may be mounted upon a bracket 40 formed integral with the frame. The spacing bars 24 and 24.1 are provided with longitudinal slots through which the blades 22 and 23 project. These slots 49 and 50 are just enough wider than the blades 22 and 23 to allow the blades to turn freely therein but are narrow enough to prevent any substantial lateral bending of the blades.

To the uprights 5 I secure bars 6 to which are fastened the ends of a semicircular cover 28 which extends entirely over the top of the blades so as to prevent contact therewith. The sides of the cover 28 are left open to permit the entry of the bread which may be carried upon feed conveyors 17 and taken away by discharge conveyors 16.

Any desired form of conveyor may be used but I have shown belt or canvas conveyers 17 and 16 running over plates 18 and 19 united to the frame. The feed conveyor 17 passes over the pulleys 7 and 12 mounted upon shafts 26 and 13, shaft 13 being supported by brace rods 21. The discharge conveyor 16 runs over a plate 19 united to the frame and over pulleys 10 and 15 carried by the shafts 11 and 14 suitably mounted in the frame and in the extensions thereof, the shaft 14 being braced by diagonal rods 20.

The rear ends of the spacing bars 24—24.1 are fitted rather loosely upon the shafts 31 and 11 so as to slide freely thereon, but if desired, additional heads as shown in dotted lines in Figure 5, corresponding to the heads 33 and 33.2 may be formed upon the rear end of the spacing bars and carry interlocking members 33.1, 33.1 similar to the interlocking members heretofore described and actuated in synchronism with the first described interlocking members by similar means connected by sprocket chains or other suitable means with the movable bars 47.

The upper series of interlocking members may be driven in synchronism with the lower series of interlocking members by gears, sprocket chains, belts or other suitable means so that the spacing of the upper and lower blades relative to each other will always be uniform.

In Figures 11 to 14, I have shown an alternate form of interlocking adjusting members in which one-half of such members are formed integral with the heads 54 of the spacing arms, and the other half of the heads 55 of the spacing arms carry within them revolvably mounted interlocking adjusting members 56.

Each head 54 has a large internal threaded bore at one end and an extended reduced externally threaded neck 59 at the other end and the shaft 51 is free to turn within the heads 54.

The interlocking adjusting members 56 are keyed or splined to the shaft 51 by keys 62 extending into grooves 61 formed in the shaft.

The interlocking adjusting members 56 are thus obliged to revolve with the shaft but all the adjusting members are freely slidable longitudinally thereon.

In order to keep the heads 55 in proper alinement with the interlocking adjusting members 56, peripheral grooves 57 are formed in the adjusting members and pins or stud bolts 60 are secured in the heads 55 at the opposite sides thereof and extend into the grooves 57 of the respective adjusters.

In the operation of this form of adjuster, when the shaft 51 is rotated it carries with it the interlocking members 56, but the heads 54 are kept from turning by the bars 51.1 and by the corresponding blade-shaft. Thus, as the shaft 51 is rotated in one direction, the external threads upon the interlocking member 56, coacting with the internal threads in the next adjacent head 54, draws the heads 55 and 54 closer together and when the shaft 51 is rotated in the opposite direction, it spreads them apart.

Likewise, as the threads on the necks 59 are in mesh with the internal threads on the adjusting members 56, but run in the opposite direction from the external threads upon the necks 58, when the shaft 51 is turned in one direction carrying with it the adjusting members 56, it will draw the succeeding heads 54 and 55 closer together and when rotated in the opposite direction, it will drive them farther apart, and these movements will be simultaneous and uniform with the relative movements of the next succeeding adjusting members 56 so that the members 54 and 55 throughout the entire series will at all times be uniformly spaced apart.

Figure 10 shows my spacing apparatus applied to band-blades in which case the spacing arms 24—24.1 will be formed with heads 33, 33.2 carrying adjusters of the same kind and arranged as heretofore described. In such cases the slots in the spacing arms 24—24.1 will extend throughout the length of the spacing arms and may be placed in the position straddling the blades 22.1 before the shafts 11 and 31 are inserted in the rear ends of the arms. A similar arrangement may be utilized in connection with short-bladed reciprocating machines where the blades are movably mounted longitudinally of the bars or supports which carry them.

In setting up my machine, with the first form of adjusters shown, the bars 47 and 48 and the interlocking adjusters may be all placed in juxtaposition to the heads of the spacer arms and the interlocking adjusters held against rotation, with the tongues and grooves in alinement. The spacing arms may then be revolved in mesh with the threads of the interlocking adjusters and will draw the interlocking adjusters toward each other to the desired distance, thus causing the tongues 45 to enter the grooves 46.

The bars 47 and 48 may then be mounted in the frame, the bushings carrying them being split for that purpose if necessary, and the corresponding slicing blades may then be set up in the position which they will occupy in the completed machine. The slotted arms may then be placed in the correct position relative to the blades and the blade-shafts may then be inserted in the bushings and extending through the central openings in the spacing arms.

The blade-shafts may then be secured in the frame and the bars 31 and 11 inserted in their corresponding bores in the rear ends of the spacing arms.

The assemblage of my machine may be simplified by threading the heads of the spacer arms and then splitting them in two halves as shown in Figure 5. The outer half may be united to the inner half of each head by set screws 65. When thus formed, the interlocking adjusting heads may be placed in proper position in the fixed half of the heads respectively and the movable halves then put in place and bolted securely by the set screws 65 and this can be done after the slicing blades and shafts 30—32 and bars 31—11 have been assembled in the machine.

When the form of adjuster shown in Figure 11 is used, the interlocking members may all be threaded together to the proper distance. The pins 60 may then be inserted and the shaft 51 slid into place.

In this form it is preferable to have the keys 62 formed integral with the bodies 56 and necks 58 and a suitable groove formed in the shaft 51 to mesh therewith.

Either of these forms of adjusters may be used with various forms of bread slicing machines and they may be applied to various other types of machinery as occasion arises therefor.

The shaft 30 is preferably located directly over the shaft 32 in a plane extending at right angles to the spacing arms 24 and 24.1, but it is obvious that the upper shaft may be located either to the rear or in advance of the lower shaft to accommodate the requirements of particular cases should occasion arise.

The drawings submitted herewith are to be regarded as illustrative and I do not limit my claims to the precise constructions shown in the drawings, for it is obvious that various modifications in the form, arrangement and proportions of the various parts may be made and in the means for driving same, or other equivalents substituted without departing from the spirit of my invention.

It is likewise obvious that more than two series of cutting blades may be used in a single machine so that more than a single loaf may be sliced at one time and I do not limit my claims to either a single series of blades or to a pair of series of blades, as three series of blades could be used to slice two loaves of bread concurrently or four series to slice three loaves of bread concurrently, etc. and additional conveyors of the same type could be added for each additional series of loaves.

I claim:

1. In a bread slicing machine, a supporting frame, a pair of spaced transverse shafts mounted on the frame, one substantially above the other, each shaft carrying a plurality of thin circular cutting blades and the blades on each shaft overlapping in axially spaced relation and alternating with the blades on the other shaft, and means for revolving the shafts simultaneously in opposite directions the radius of the overlapping portions of said blades being equal to or slightly longer than the height of the loaves of bread to be sliced thereby, in combination with slotted arms supported by the frame extending transversely from front to rear of the cutting blades at the upper and lower portions of their cutting courses to hold said blades against lateral bending or displacement at the front and rear edges thereof.

2. A mechanism as described in claim 1, said blades being disposed at laterally uniform distances apart.

3. In a bread slicing machine having a frame and a series of cutting blades movably mounted therein, of a spacing mechanism comprising slotted spacer arms arranged to straddle the slicing blades at the bottom of their cutting courses, each of said arms having formed integral therewith at one end of the arm a head, all the heads in said series being fixed against revolution and alternate heads having internally threaded bores and externally threaded necks formed thereon, the intervening heads of the series being formed with internal transverse bores in each of which is mounted a rotatable interlocking spacing member having an internally threaded annular body fitting within the head and revolvable therein, each of said bodies being formed with an externally threaded neck, the external threads on each neck corresponding in pitch with the internal threads of such body but running in opposite directions thereto and the external threads upon the revolvable necks corresponding in pitch with the internal threads of the nonrevolvable heads and running in the same direction whereby the threads upon each neck will mesh and coact with the internal threads upon the revolvable body or the nonrevolvable head adjacent to it, peripheral grooves formed in the revolvable bodies and pins or keys united to the heads in which said bodies are revolvable and extending into said grooves whereby the revolvable bodies are maintained in alinement with the heads in which they revolve, a transverse shaft extending through all of said heads, bodies and necks and having a groove in which the revolvable bodies are keyed or splined, all the parts being so arranged that revolution of the shaft in one direction will cause the series of spacing arms to contract simultaneously and uniformly and revolution of the shaft in the opposite direction will cause the series of spacing arms to expand simultaneously and uniformly, and means to rotate the shaft.

4. An adjustable spacing mechanism to uniformly adjust the spacing of a movable series of parts, comprising slotted spacer arms arranged to embrace the parts to be spaced, each of said arms having formed integral therewith at one end of the arm a head, all heads in said series being fixed against revolution and alternate heads having internally threaded bores and externally threaded necks formed thereon, the threads of the bores and necks being of corresponding pitch but running in opposite directions, the intervening heads of the series being formed with internal transverse bores in each of which is mounted a rotatable interlocking spacing member having an internally threaded annular body fitting within the head and freely revolvable therein, each of said bodies being formed with an internally threaded bore and an externally threaded neck, the external threads on each neck corresponding in pitch with the internal threads of such bore but running in opposite directions thereto and the external threads upon the revolvable necks corresponding in pitch with the internal threads of the nonrevolvable heads and running in the same direction, whereby the threads upon each nonrevolvable neck will mesh and coact with the internal threads upon the adjacent revolvable body and the threads of each revolvable neck will mesh with the internal threads in the nonrevolvable head adjacent to it, peripheral grooves formed in the revolvable bodies and pins or keys united to the heads in which said bodies are revolvable and extending into said grooves whereby the revolvable bodies are maintained in alinement with the heads in which they revolve, a transverse shaft extending through all of said heads, bodies and necks and having a groove in which the revolvable bodies are keyed or splined, all the parts being so arranged that revolution of the shaft in one direction will cause the series of spacing arms to contract simultaneously and uniformly and revolution of the shaft in the opposite direction will cause the series of spacing arms to expand simultaneously and uniformly, and means to rotate the shaft.

5. In a bread slicing machine, the combination with a frame and a series of cutting blades movably mounted therein, of a spacing mechanism as described in claim 4 and having the slotted spacer arms arranged to straddle and move laterally the cutting blades.

6. In a slicing machine, the combination with a frame, of two spaced apart series of laterally movable cutting blades, a spacing mechanism as described in claim 4 applied to each series of blades, and means for simultaneously and uniformly actuating both spacing mechanisms.

7. In a bread slicing machine, the combination with a supporting frame, of a pair of spaced transverse shafts mounted on the frame, each shaft carrying a plurality of thin, circular cutting blades and the blades on each shaft alternating with the blades on the other shaft and overlapping for a space equal to or a little more than the height of a loaf to be sliced, means for revolving the shafts simultaneously in opposite directions, adjusting means including spaced series of arms supported by the frame and extending transversely from front to rear of the cutting blades at opposite portions of their cutting courses to hold said blades against lateral bending or displacement, and adjusting means to uniformly adjust the spacing of the arms while the machine is either at rest or in motion, each arm having a central slot through which its corresponding blade extends, and a central bore through which the corresponding blade-shaft passes and in which it freely revolves.

8. In a bread slicing machine, a supporting frame, a pair of parallel spaced transverse shafts mounted on the frame one spaced above the other, each shaft carrying a plurality of thin circular cutting blades in axially spaced relation, the blades on each shaft alternating with the blades of the other shaft and overlapping same a distance slightly greater than the height of a loaf of bread to be sliced, a pair of crossbars mounted on the frame in front of the blades, a plurality of slotted longitudinal arms slidably mounted upon the crossbars arranged with the slots embracing the blades respectively, said slots being of a width just sufficient to permit free revolution of the blades therein, and also to afford support against lateral bending at the front and rear portions of the blades approximately at the first and last points of contact of the blades with the bread.

9. A machine as described in claim 8, in combination with adjusting means to uniformly adjust the lateral spacing of the blades while the machine is either at rest or in motion, and a conveyor to carry the loaves of bread to the blades and to present one or both of the pan corners of the loaves for first contact with the cutting blades.

10. In a bread slicing machine, a supporting frame, a pair of parallel spaced transverse shafts mounted on the frame one spaced above the other, each shaft carrying a plurality of thin circular cutting blades in axially spaced relation, the blades on each shaft alternating with the blades of the other shaft and overlapping same a distance slightly greater than the height of a loaf of bread to be sliced, a pair of crossbars mounted on the frame in front of the blades, a plurality of slotted longitudinal arms slidably mounted upon the crossbars arranged with the slots embracing the blades respectively, said slots being of a width just sufficient to permit free revolution of the blades therein and also to afford support against lateral bending at the front of the blades approximately at the first point of contact of the blades with the bread.

HARRY J. CRINER.

REFERENCES CITED

The following references are of record in the file of this patent:

UNITED STATES PATENTS

| Number | Name | Date |
|---|---|---|
| Re. 21,376 | Walma | Feb. 27, 1940 |
| 240,310 | Drake | Apr. 19, 1881 |
| 385,234 | Bon | June 26, 1888 |
| 984,237 | Osburn, Jr. | Feb. 14, 1911 |
| 1,710,327 | Walters | Aug. 23, 1929 |
| 1,937,248 | Rohwedder et al. | Nov. 28, 1933 |
| 1,962,779 | Krum et al. | June 12, 1934 |
| 2,011,473 | Criner | Aug. 13, 1935 |
| 2,011,475 | Debus | Aug. 13, 1935 |
| 2,150,427 | Criner | Mar. 14, 1939 |
| 2,336,050 | Walma | Dec. 7, 1943 |